United States Patent
Zhioua et al.

[11] Patent Number: 5,988,113
[45] Date of Patent: Nov. 23, 1999

[54] SELF-ACTIVATED ACARICIDE APPLICATOR FOR CONTROLLING ECTOPARASITES ON ANIMALS

[75] Inventors: Elyes Zhioua, Wood River Junction; Roger A. LeBrun, West Kingston; Ahmed Zaki, Kingston; David Butler, North Kingston, all of R.I.

[73] Assignee: The Board of Governors for Higher Education, State of Rhode Island and Providence Plantations, Providence, R.I.

[21] Appl. No.: 09/063,090

[22] Filed: Apr. 20, 1998

[51] Int. Cl.$^6$ .................................................. A01K 29/00
[52] U.S. Cl. ........................................... 119/666; 119/657
[58] Field of Search ..................... 119/656, 657, 119/658, 665, 666, 667, 669, 604, 163; 250/221; 251/11

[56] References Cited

U.S. PATENT DOCUMENTS

| | | | |
|---|---|---|---|
| 4,459,942 | 7/1984 | Cauthron | 119/666 |
| 5,009,192 | 4/1991 | Burman | 119/720 |
| 5,050,539 | 9/1991 | Liegner | 119/666 |
| 5,063,880 | 11/1991 | Bouthillier | 119/667 |
| 5,367,983 | 11/1994 | Pound et al. | 119/53 |
| 5,483,922 | 1/1996 | Hall | 119/428 |
| 5,501,179 | 3/1996 | Cory | 119/712 |
| 5,603,287 | 2/1997 | Houck | 119/719 |
| 5,630,379 | 5/1997 | Gerk et al. | 119/667 |
| 5,758,603 | 6/1999 | Vivier | 119/669 |

OTHER PUBLICATIONS

A self–medicating applicator for control of ticks on deer, Daniel E. Sonenshine et al., Medical and Veterinary Entomology (1996) 10, 149–154.

Journal of Medical Entomology, vol. 33, No. 3, p. 394.

Pathogenicity of the entomopathogenic fungus *metarhizium anisopliae* (deuteromycetes) to *ixodes scapularis* (acari: ixodidae), Elyes Zhioua et al., J. Parasitol., 83(5), 1997, pp. 815–818.

*Primary Examiner*—Michael J. Carone
*Assistant Examiner*—James S. Bergin
*Attorney, Agent, or Firm*—Samuels, Gauthier & Stevens

[57] ABSTRACT

A self-activated acaricide applicator for killing ticks on large mammals. The applicator is self-activated by motion and heat detection when the mammal moves to investigate an attractant canister. This results in the discharge of an atomized acaricide onto the mammal.

4 Claims, 2 Drawing Sheets

5,988,113

SELF-ACTIVATED ACARICIDE APPLICATOR FOR CONTROLLING ECTOPARASITES ON ANIMALS

BACKGROUND OF THE INVENTION

1. Field of the Invention

The present invention relates to controlling ectoparasites on animals.

2. Description of Related Art

There exist many diseases that are transmittable to man and animals by ectoparasites. Of particular concern is Lyme disease. This disease has been shown to have serious and long-lasting, debilitating effects on man and domestic animals.

The economic impact of Lyme disease is considerable in terms of the cost of the health care associated with the disease, and the loss of productivity for people disabled by the illness. The white-tailed deer is the reproducible host of the adult female deer tick. When these ticks attach to deer, feed to repletion and then drop off they produce between 2,500 to 3,500 eggs, most of all of which hatch in the leaf litter below. Deer are therefore potent amplification arms for deer tick populations.

A system for controlling the deer tick population through the effective application of acaricides to deer is described in U.S. Pat. No. 5,050,539. In that system, a salt-lick is provided to entice the deer to a particular location. An automatic pressure responsive spray device for dispensing acaricide is positioned to spray the deer. The spray device is actuated by a sensor which detects the pressure on a platform caused by a deer when licking the salt lick. In this way the deer come to the site of application of the acaricide on a regular basis to be de-ticked.

Sensing the pressure on a platform is not always satisfactory. The pressure applied to the platform by a deer licking the salt-lick, may or may not actuate the spray. If the sensor is very sensitive to pressure, then it can easily be actuated by other animals which may approach the salt-lick, which animals would not be carrying the ticks. Alternatively, these systems are not constantly watched and if an object, such as a branch or the like, fell upon the platform, the acaricide would be sprayed continuously.

SUMMARY OF THE INVENTION

The present invention is directed to a system and method for controlling, in a preferred embodiment, ticks. The invention embodies a self-activated acaricide applicator for killing ticks on large mammals by active transfer of acaricide or bioacaricide during feeding. The applicator is self-activated by motion and heat detection when the mammal, e.g., deer, moves to investigate an attractant canister. This results in the discharge of an atomized acaricide onto the deer. The heat and motion detector is controlled to ensure that only mammals of a defined size are detected.

In a preferred embodiment, there is a dual either/or sensing system. In addition to the infrared detection, there is a sensor embodied in the attractant canister which responds to contact. If one sensor system functions, the other does not function.

Broadly, the system of the invention comprises a self-activated acaricide applicator having an attractant canister secured to the housing to expose the attractant to ambient. The housing has an upper and a lower end, the lower end secured to ground and an arm secured to the upper end. A motion and heat detector is secured to the arm, the detector adapted to sense heat and motion within a defined sensing zone. An atomizer is secured to the arm and adapted to discharge a spray toward the attractant canister to contact a mammal investigating the attractant canister. Upon the sensing of the heat and motion of the mammal, the atomizer discharges a spray of acaricide onto a targeted area of a mammal. In a preferred embodiment, a second sensor secured to the canister and responsive to touch is operable if the motion and heat detector does not function.

DESCRIPTION OF THE PREFERRED EMBODIMENT(S)

Figure 1:
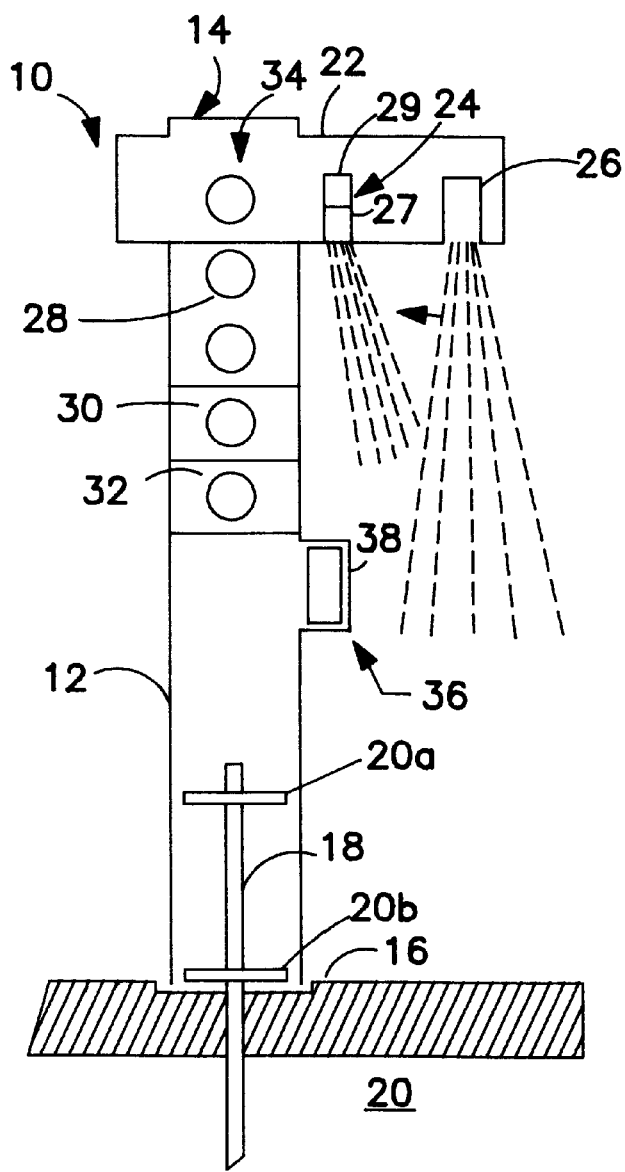
FIG. 1 is an elevation of an applicator of the invention.
Figure 2:
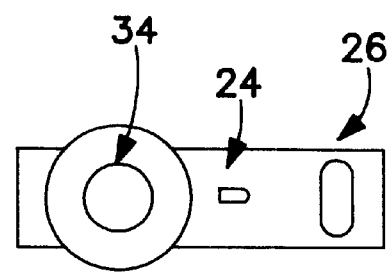
FIG. 2 is a plan view of FIG. 1.

Referring to FIG. 1, an applicator system embodying the invention is shown generally at 10 and comprises a tubular housing 12 having an upper end 14 and a lower end 16. A post, shown generally at 18, is received in the lower end 16 and is in turn secured in the ground 20. Retaining rings 20*a* and 20*b* are fixedly secured to the post 18 and their outer surfaces frictionally engage the inner surface of the post 18 to maintain the post 18 in a fixed upright position.

The upper end 14 of the housing 12 comprises an arm 22 which extends from the housing 12 and is substantially parallel to ground 20. Secured in the arm 22 is an atomizer 24. A commercially available atomizer, such as a starch atomizer, can be used. A detector 26 is secured in the arm 22. The detector 26 is an infrared detector cell fitted with a view pipe 27 and fractured fresnel lens 29 to convert the moving heat signature and motion from a deer into a stable signal corresponding to a specific size of mammal. The view pipe can be changed to adapt the applicator system for any size animal. This type of detector cell and view pipe are well within the skill of the art. A commercially available detector such as Heinemann Cell can be used.

A pressure tank 28 is secured in the housing 12 and is typically half-filled with acaricide and the remainder filled with air under a pressure of between about 50 to 180 psig. A battery 30 powers the system. A module 32 controls the operation of the system. An attractant canister 36 is secured to the housing 12. A grid-like conductive sensor 38 covers the canister 36.

Figure 3:
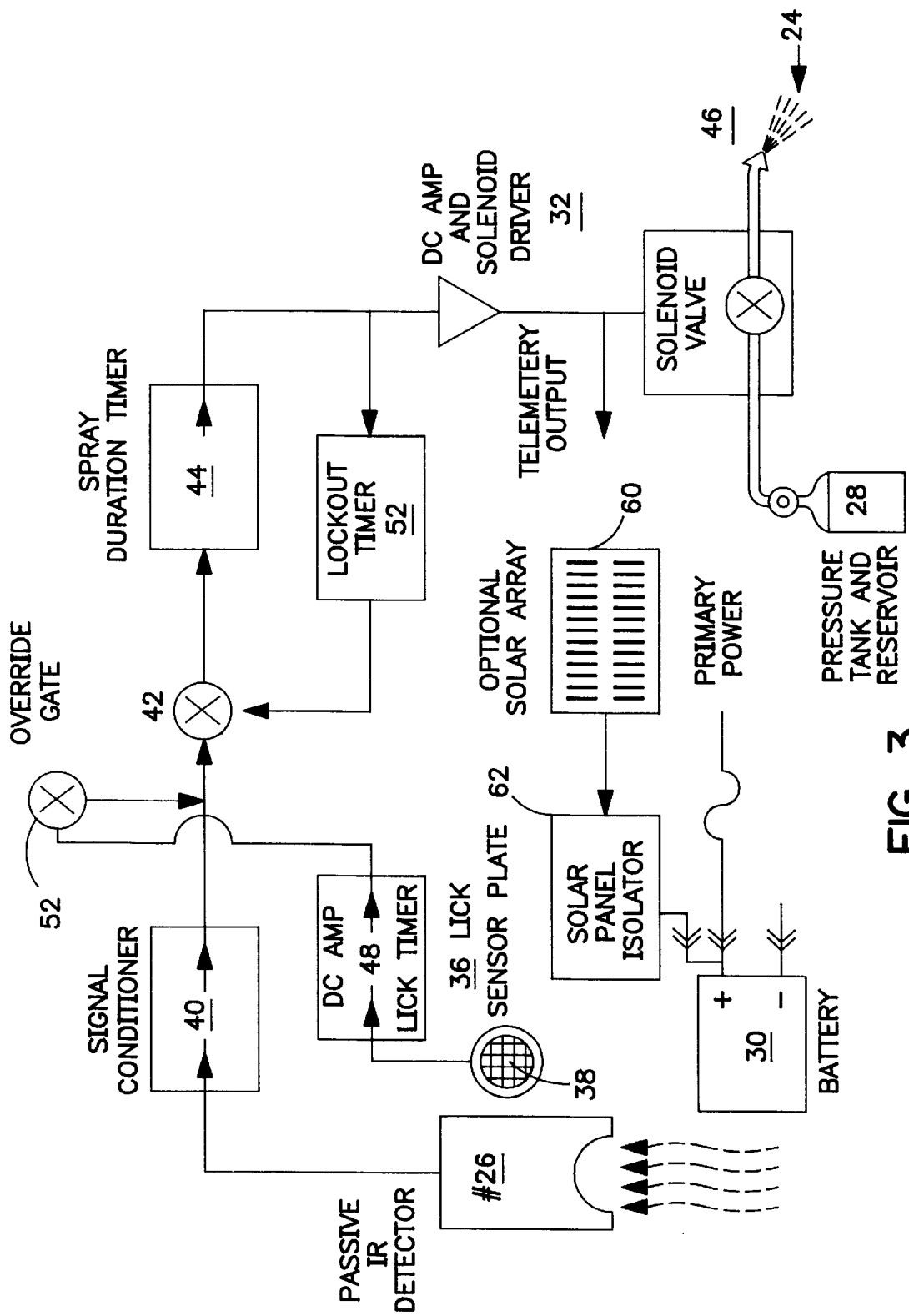
FIG. 3 is a schematic of the control circuit.

Referring to FIG. 3, a schematic of the control module and associated components is illustrated. In the operation of the invention, when the applicator system 10 is placed in the field, its water-tight, pressure resistant tank 28 is half filled with acaricide and then pressurized. The battery 30 is charged and connected, activating the system. The detector 26 (first system) looks for heat and motion. As is well understood, the detector is operable to detect heat and motion within a 'defined sensing zone' and the atomizer 24 is positioned to contact the deer investigating the attractant canister 36. When a deer approaches and is sensed by the detector 26, an infrared cell amplifier 40 boosts the signal level and lowers the impedance of the signal from the detector 26 to drive a solid state switch 42. This, in turn, actuates a timer 44 (e.g. three seconds) which, in turn, actuates a coil (not shown) in an electromagnetic solenoid 46 controlling the atomizer 24. When the solenoid 46 opens, acaricide contained in the tank 28 flows through the solenoid 46 to the atomizer 24, and sprays the target area. At the same time the signal from the timer 44 actuates a lockout timer 52. This timer 52 closes the switch 42 for a predetermined time, e.g. 2 minutes. Also a signal is sent to the lockout timer. This delay is to ensure that a deer will not receive multiple sprayings. At the end of two minutes the switch 42 can again be turned on by a signal from either the sensor 26 or the sensor 38.

If the sensor 26 does not function when the deer contacts the sensor 38 (second system), this sensor 38 detects a change in impedence. The saliva of a deer's tongue is conductive on the order of $700\mu$ ohms. The signal from the sensor 38 is amplified at DC amplifier 48 and actuates a switch 52 which in turn actuates the timer 44 to spray the deer as just described. Also the lockout timer 52 is actuated. With this configuration, if the detector 26 fails, the sensor 38 functions as backup.

Optionally, a solar panel 60 and a solar panel isolator 62 can be used as a power source for the battery 30. In an alternative embodiment of the invention, a numeric counter can register each nozzle/solenoid activation providing a backup source of use data.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A self-activated acaricide applicator which comprises:

a housing;

an attractant canister secured to the housing to expose the attractant to ambient;

the housing having an upper and a lower end, the lower end secured to ground, an arm secured to the upper end, a motion detector secured to the arm, the motion detector adapted to sense heat and motion within a defined sensing zone and an atomizer secured to the arm adapted to discharge a spray toward the attractant canister to contact a mammal investigating said attractant canister, a source of acaricide in communication with the atomizer;

means to sense the size of the mammal;

means to control the activation of the nozzle based on the size of the mammal; and means to control the sensing of the heat and motion of the mammal and the actuation of the nozzle to discharge a spray of acaricide onto a targeted area of a mammal.

2. The applicator of claim 1 which comprises:

a sensor secured to the canister and responsive to contact.

3. The applicator of claim 2 which comprises:

means to disable the sensors for a predetermined period of time.

4. The applicator of claim 2 which comprises:

means to disable one sensor when the other sensor is enabled.

* * * * *